US 6,722,148 B2

(12) United States Patent
Aoki et al.

(10) Patent No.: US 6,722,148 B2
(45) Date of Patent: Apr. 20, 2004

(54) VEHICLE SEAT AIR CONDITIONING SYSTEM HAVING ELECTRIC HEATER AND BLOWER UNIT

(75) Inventors: Shinji Aoki, Chiryu (JP); Toshifumi Kamiya, Takahama (JP); Yuji Honda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/358,058

(22) Filed: Feb. 4, 2003

(65) Prior Publication Data

US 2003/0150229 A1 Aug. 14, 2003

(30) Foreign Application Priority Data

Feb. 12, 2002 (JP) ........................................ 2002-034163

(51) Int. Cl.[7] .................................................. B60H 1/32
(52) U.S. Cl. ........................ 62/244; 219/217; 392/379; 297/180.13
(58) Field of Search ................... 62/244, 261; 219/217; 392/379, 384, 385; 297/180.12, 180.13, 180.14

(56) References Cited

U.S. PATENT DOCUMENTS

| 4,013,083 A | * | 3/1977 | Helbling ...................... 132/271 |
| 5,434,946 A | * | 7/1995 | Barzilai et al. ............. 392/385 |
| 5,894,207 A | * | 4/1999 | Goings ........................ 318/478 |
| 6,079,485 A | * | 6/2000 | Esaki et al. .................... 165/43 |
| 6,093,910 A | * | 7/2000 | McClintock et al. ....... 219/217 |
| 6,186,592 B1 | | 2/2001 | Orizaris et al. |
| 6,189,966 B1 | * | 2/2001 | Faust et al. ............. 297/180.14 |
| 6,196,627 B1 | * | 3/2001 | Faust et al. ............. 297/180.14 |
| 6,255,790 B1 | * | 7/2001 | Popp et al. .................. 318/280 |
| 6,339,302 B1 | * | 1/2002 | Greenbank et al. ......... 318/103 |
| 6,369,529 B1 | * | 4/2002 | McClintock et al. ......... 318/16 |
| 6,494,284 B1 | * | 12/2002 | Cooper ........................ 180/282 |
| 6,629,725 B1 | * | 10/2003 | Kunkel et al. ......... 297/180.12 |

FOREIGN PATENT DOCUMENTS

| JP | 61-107612 | | 7/1986 |
| JP | 407155240 A | * | 6/1995 |
| JP | 02000351313 A | * | 12/2000 |
| JP | 02001171333 A | * | 6/2001 |

* cited by examiner

Primary Examiner—William E. Tapolcai
Assistant Examiner—Mohammad M. Ali
(74) Attorney, Agent, or Firm—Harness, Dickey & Pierce, PLC

(57) ABSTRACT

Electric heaters and blower units are disposed inside an occupant seat having exterior cover members, each of which has a plurality of outlet openings. Each electric heater heats the corresponding exterior cover member, and each blower unit blows air through the outlet openings of the corresponding cover member. Manipulation dials are provided to manipulate the corresponding electric heaters and blower units. A variable heating power command signal, which commands increasing or decreasing of a heating power of each corresponding electric heater, and a variable flow rate command signal, which commands increasing or decreasing of an air flow rate of each corresponding blower unit, are generated through adjustment manipulation of the manipulation dial in synchronism with movement of the manipulation dial.

12 Claims, 7 Drawing Sheets

VEHICLE SEAT AIR CONDITIONING SYSTEM HAVING ELECTRIC HEATER AND BLOWER UNIT

CROSS REFERENCE TO RELATED APPLICATION

This application is based on and incorporates herein by reference Japanese Patent Application No. 2002-34163 filed on Feb. 12, 2002.

BACKGROUND OF THE INVENTION

1. Field of the Invention

The present invention relates to a vehicle seat air conditioning system installed in a vehicle occupant seat.

2. Description of Related Art

Various vehicle seat air conditioning systems have been proposed. One such a vehicle seat air conditioning system has an electric heater and a blower unit installed in a vehicle occupant seat. In this vehicle seat air conditioning system, an exterior cover member of the seat can be directly heated by the electric heater, and air (warm air), which is heated by the electric heater, can be blown outwardly through outlet openings of the exterior cover member of the seat.

In the previously proposed seat air conditioning system, a heater manipulating member for adjusting a heating power of the electric heater installed in the seat is provided separately from a blower manipulating member for adjusting an air flow rate of the blower unit installed in the seat, so that the operation of the seat air conditioning system is not simple.

Furthermore, in the vehicle, due to limitation imposed by a balance between the amount of charged electricity, which is charged in a vehicle battery by a vehicle electric generator, and the amount of discharged electricity, which is discharged from the vehicle battery, the heating power of the electric heater installed in the seat is normally set to a relatively small value, i.e., about 60 to 90 W. Thus, when an excessively high air flow rate, which is excessive with respect to the heating power of the electric heater, is set, the cold air, which has not been sufficiently heated, is blown to a vehicle occupant seated on the seat. As a result, the occupant experiences cold sensation, deteriorating feeling of warmness of the vehicle occupant.

SUMMARY OF THE INVENTION

The present invention addresses the above disadvantages. Thus, it is an objective of the present invention to improve manipulability of a vehicle seat air conditioning system, which includes an electric heater and a blower unit installed therein.

It is another objective of the present invention to prevent deterioration of feeling of warmness induced by blowing cold air from a seat that has the seat air conditioning system.

To achieve the objectives of the present invention, there is provided a seat air conditioning system for a vehicle occupant seat that is placed in a passenger room of a vehicle and includes at least one exterior cover member, which forms an occupant contacting surface of the seat for contacting with a vehicle occupant and has a plurality of outlet openings penetrating through the exterior cover member. The seat air conditioning system includes at least one electric heater and at least one blower unit, which are disposed inside the seat. Each electric heater heats a corresponding one of the at least one exterior cover member of the seat, and each blower unit blows air through the outlet openings of a corresponding one of the at least one exterior cover member. The seat air conditioning system further includes a single manipulating means for manipulating the at least one electric heater and the at least one blower unit. The single manipulating means is disposed inside the passenger room and is manually manipulatable. A variable heating power command signal, which commands increasing or decreasing of a heating power of each corresponding electric heater, and a variable flow rate command signal, which commands increasing or decreasing of an air flow rate of each corresponding blower unit, are generated through adjustment manipulation of the single manipulating means in synchronism with movement of the single manipulating means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

(First Embodiment)

Figure 1:
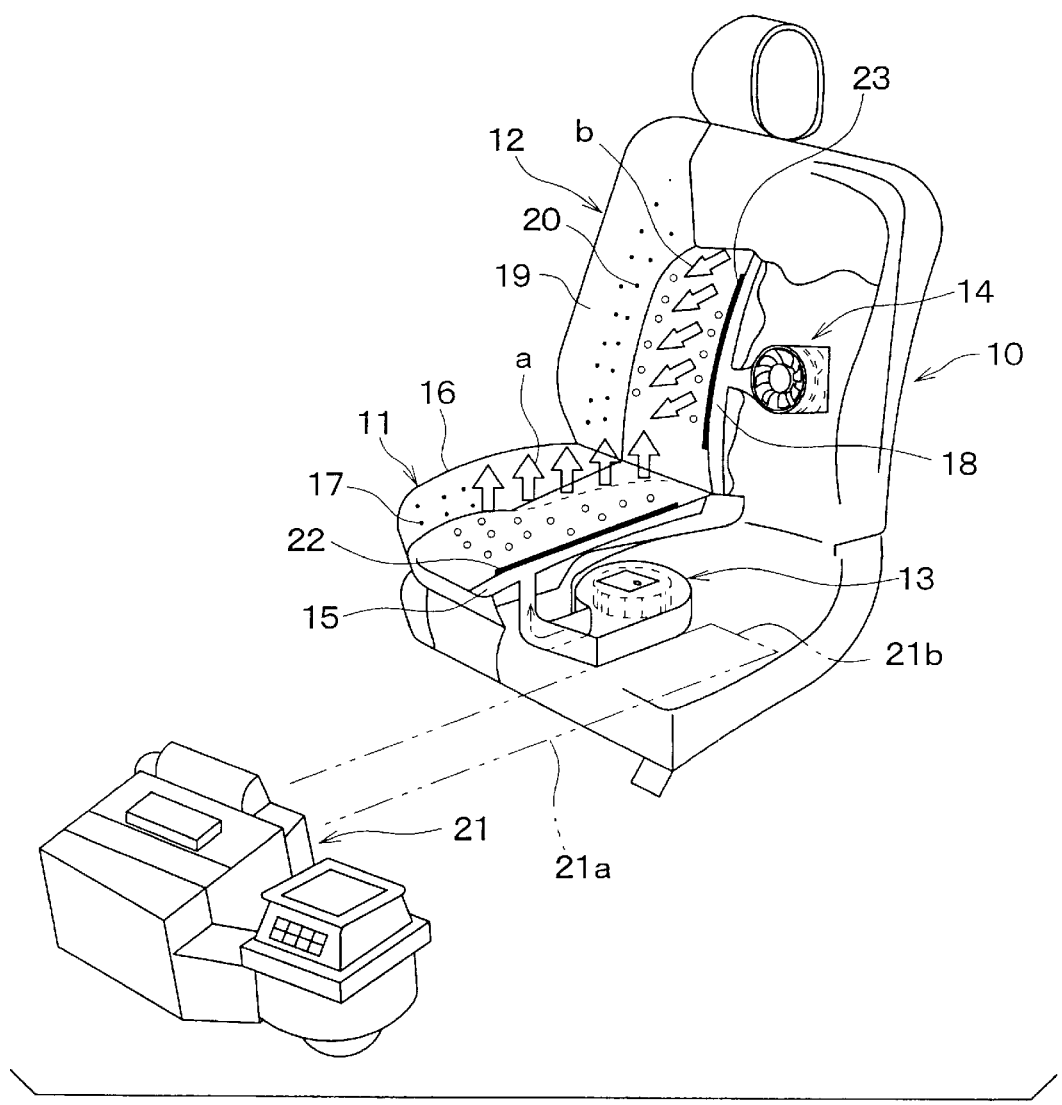
FIG. 1 is a partially fragmented schematic perspective view showing a vehicle seat air conditioning system according to a first embodiment of the present invention.

FIG. 1 is a schematic view of a vehicle occupant seat 10 according to a first embodiment of the present invention. Specifically, the seat 10 shown in FIG. 1 is used as a driver seat or a front non-driver seat of a vehicle.

The seat 10 includes a seat cushion assembly 11 and a backrest assembly 12. The seat cushion assembly 11 supports buttocks of a vehicle occupant. The backrest assembly 12 supports a back region of the occupant. A first blower unit 13 is arranged inside the seat cushion assembly 11, and a second blower unit 14 is arranged inside the backrest assembly 12. Each of the first and second blower units 13, 14 includes an electric motor and a blower fan driven by the electric motor.

An air intake opening (not shown) of the first blower unit 13 is arranged at a lower side of the seat cushion assembly 11. The air in a passenger room of the vehicle is drawn by the first blower unit 13 through the air intake opening and is then blown by the first blower unit 13 against an exterior cover member 16 of the seat cushion assembly 11 through an air passage 15 arranged in the seat cushion assembly 11, so that the air is discharged toward the body of the occupant through a plurality of air outlet openings 17, which extend through the exterior cover member 16, as indicated by arrows "a" in FIG. 1.

The second blower unit 14 blows the air in a manner similar to that of the first blower unit 13. That is, an air intake opening (not shown) of the second blower unit 14 is arranged in a rear surface of a lower end section of the backrest assembly 12. The air in the passenger room of the vehicle is drawn by the second blower unit 14 through the air intake opening and is then blown to the body of the occupant through an internal air passage 18 of the backrest assembly 12 and then through a plurality of air outlet openings 20 arranged in an exterior cover 19 of the backrest assembly 12, as indicated by arrows "b" in FIG. 1.

A passenger room air conditioning unit 21 is arranged inside an instrument panel (not shown) that is arranged in a front section of the passenger room. As is known in the art, the passenger room air conditioning unit 21 includes an inside air/outside air switching box, a centrifugal blower, a cooling heat exchanger, a heating heat exchanger, a temperature adjusting mechanism and a blow mode switching mechanism. The centrifugal blower blows the inside air or the outside air, which is introduced into the inside air/outside air switching box. The cooling heat exchanger and the heating heat exchanger exchange heat with the air blown by the centrifugal blower. The temperature adjusting mechanism adjusts the temperature of the blown air, which is discharged from the passenger room air conditioning unit 21 into the passenger room. The blow mode switching mechanism switches the blow mode of the blown air discharged from the passenger room air conditioning unit 21 into the passenger room. With the above arrangement, the blown air, which is blown by the centrifugal blower, is cooled, dehumidified and/or reheated in the passenger room air conditioning unit 21 and is then discharged into the passenger room after the temperature adjustment. Thus, each of the first blower unit 13 and the second blower unit 14 can suction the conditioned air in the passenger room and can discharge it.

Particularly, in a case where a rear seat heater duct 21a is arranged beneath the front seat 10, a rear seat heater discharge opening 21b of the rear seat heater duct 21a is normally positioned slightly rearward of the fore-and-aft center of the front seat 10. The conditioned air (warm air) of the passenger room air conditioning unit 21 is discharged from the rear seat heater duct 21a toward the feet of the rear passengers through the rear seat heater discharge opening 21b arranged at a distal end of the rear seat heater duct 21a. The air intake opening of the first blower unit 13 of the seat cushion assembly 11 is designed to open near the rear seat heater discharge opening 21b. Thus, during the heating operation in the winter season, the warm air, which is discharged from the rear seat heater discharge opening 21b, can be drawn and blown by the first blower unit 13.

Furthermore, in each of the seat cushion assembly 11 and the backrest assembly 12, an electric heater 22, 23 is arranged on the backside of the exterior cover member 16, 19. Each electric heater 22, 23 includes a wire-type electric resistor and is arranged along a meandering path in a wide area of an occupant contacting surface of each corresponding one of the seat cushion assembly 11 and the backrest assembly 12.

Thus, when each electric heater 22, 23 is energized to generate heat, the exterior cover member 16, 19, which serves as the occupant contacting surface of the seat cushion assembly 11 or of the backrest assembly 12, can be directly heated by the electric heater 22, 23. Furthermore, when each blower unit 13, 14 is operated simultaneously with the energization of the electric heater 22, 23, the warm air heated by the electric heater 22, 23 can be discharged through the outlet openings 17, 20.

The exterior covering member 16, 19 of the seat 10 is chosen to be made of leather or fabric upon consideration of a seat design. In the case of the exterior covering member 16, 19 made of the leather, a relatively large number of small holes, each of which has an inner diameter of about 0.8 to 1.0 mm, are made through the exterior covering member 16, 19 to form the outlet openings 17, 20 since the leather does not substantially permeate the air. Contrary to this, the exterior covering member 16, 19 made of the fabric originally has spaces between the fibers of the fabric to allow permeation of the air, so that there is no need to perforate the exterior covering member 16, 19. That is, in the case of the exterior covering member 16, 19 made of the fabric, the spaces between the fibers of the fabric can serve as the outlet openings 17, 20.

Figure 2:
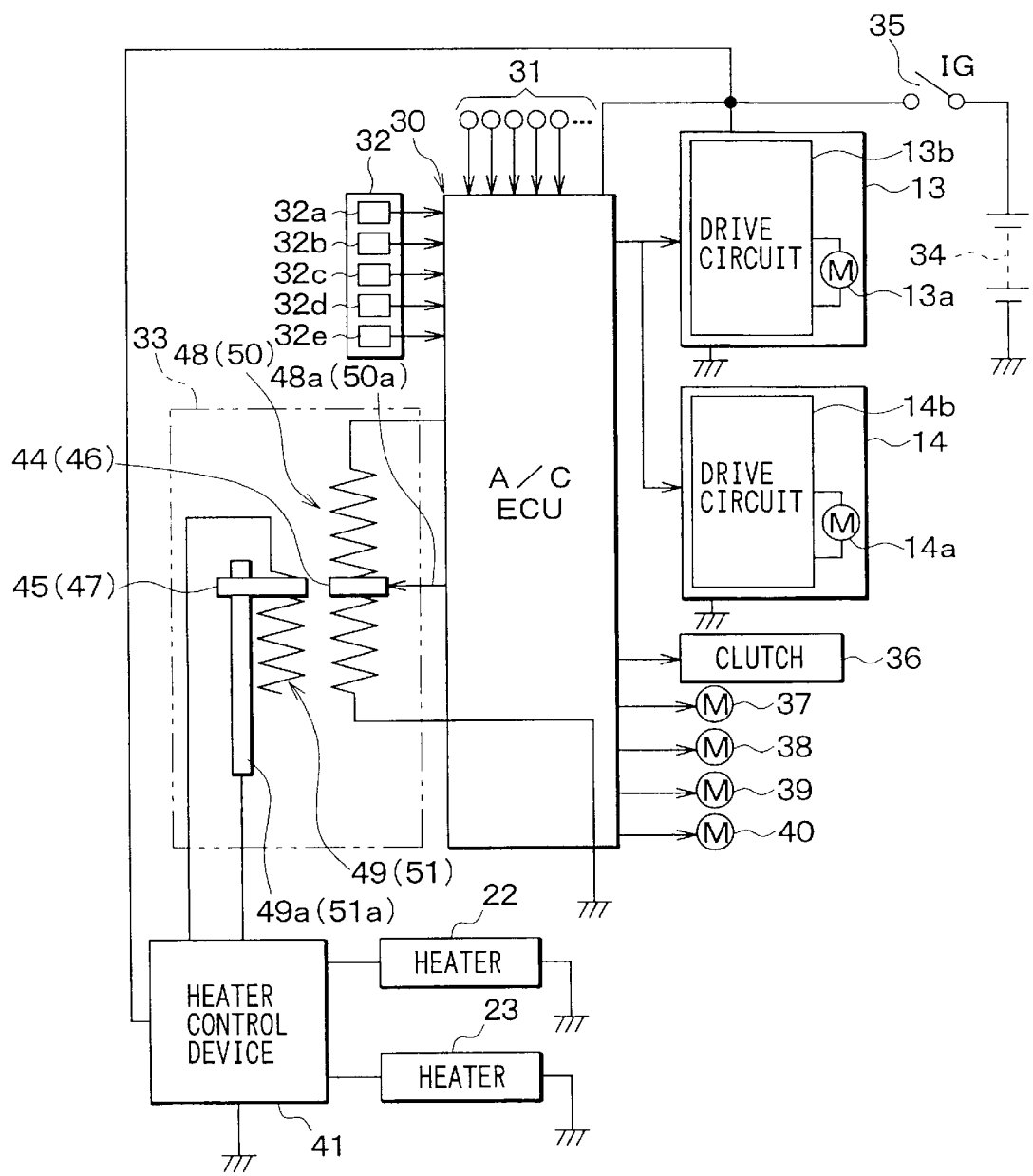
FIG. 2 is a schematic circuit diagram showing electrical control arrangement according to the first embodiment.

FIG. 2 schematically shows an electrical arrangement according to the first embodiment. The air conditioning control device 30 is provided as a control means for controlling the temperature and a flow rate of the air discharged from the passenger room air conditioning unit 21 into the passenger room. Furthermore, in the first embodiment, the air conditioning control device 30 also controls an air flow rate of each of the blower units 13, 14 of the seat air conditioning system.

The air conditioning control device 30 includes a known microcomputer and a peripheral circuit. The known microcomputer includes, for example, a central processing unit (CPU), a read only memory (ROM) and a random access memory (RAM). The ROM stores a control program for performing air conditioning control, and the air conditioning control device 30 performs computations and other operations based on the control program. Sensor output signals from a group of sensors 31, operation signals from an air conditioning control panel 32 and operation signals from a seat air conditioning control panel 33 are inputted to input terminals of the air conditioning control device 30. Electric power is supplied from a vehicle battery 34 to the air conditioning control device 30 through an ignition switch 35 of a vehicle engine.

The group of sensors 31 includes a sensor for measuring the outside air temperature (i.e., the air temperature outside the passenger room) TAM, a sensor for measuring the inside air temperature (i.e., the air temperature inside the passenger room) TR, a sensor for measuring the amount of solar radiation TS, a sensor for measuring the water temperature TW and a sensor for measuring the evaporator outlet air temperature (evaporator cooling temperature) TE.

The air conditioning control panel 32 is arranged adjacent to the instrument panel (not shown) in front of the driver seat in the passenger room and includes operation switches 32a–32e, which are operated by the occupant. Among the operation switches 32a–32e, a target air temperature setting switch 32a outputs a signal, which indicates a target air temperature of the passenger room, and an inside air/outside air selecting switch 32b outputs a signal for manually setting one of an inside air mode and an outside air mode as an air intake mode.

A blow mode selecting switch 32c outputs a signal for manually setting one of a face mode, a bi-level mode, a foot mode, a foot defroster mode and a defroster mode as a blow mode. An air flow rate selecting switch 32d outputs a signal for manually setting on/off of the blower of the passenger room air conditioning unit 21. The air flow rate selecting switch 32d also outputs a signal for manually setting an air flow rate of the blower of the passenger room air conditioning unit 21. An air conditioning switch 32e outputs the on signal and the off signal to intermittently operate the air conditioning compressor.

Drive motors 13a, 14a of the blower units 13, 14 of the seat air conditioning system are connected to output terminals of the air conditioning control device 30 through corresponding motor drive circuits 13b, 14b. Furthermore, for achieving air conditioning operation of the passenger room air conditioning unit 21, an electromagnetic clutch 36 of the compressor, a blower motor 37, an inside air/outside air switching door actuator motor 38, a temperature adjusting door actuator motor 39 and a blow mode switching door actuator motor 40 are also connected to corresponding output terminals of the air conditioning device 30.

A dedicated heater control device 41 for controlling the electric heaters 22, 23 of the seat air conditioning system is also provided. A control signal from the seat air conditioning control panel 33 is inputted to the heater control device 41. The heater control device 41 controls the heating power of each electric heater 22, 23 by controlling the voltage applied to the electric heater 22, 23 based on the control signal from the seat air conditioning control panel 33. Electric power is supplied from the vehicle battery 34 to the heater control device 41 through the ignition switch 35 of the vehicle engine.

The seat air conditioning control panel 33 will be described in greater detail with reference to FIGS. 2 and 3. The seat air conditioning control panel 33 is arranged near the instrument panel in the passenger room. The seat air conditioning control panel 33 includes a right seat air conditioning manipulation dial (hereinafter, simply referred to as a right manipulation dial) 42 for the right seat (this is the driver seat in a case of a vehicle with a right-hand steering wheel) and a left seat air conditioning manipulation dial (hereinafter, simply referred to as a left manipulation dial) 43 for the left seat (this is the front non-driver seat in a case of the vehicle with the right-hand steering wheel). The right and left manipulation dials (each serving as a manipulating means) 42, 43 can be manually rotated by the occupant.

Figure 3:
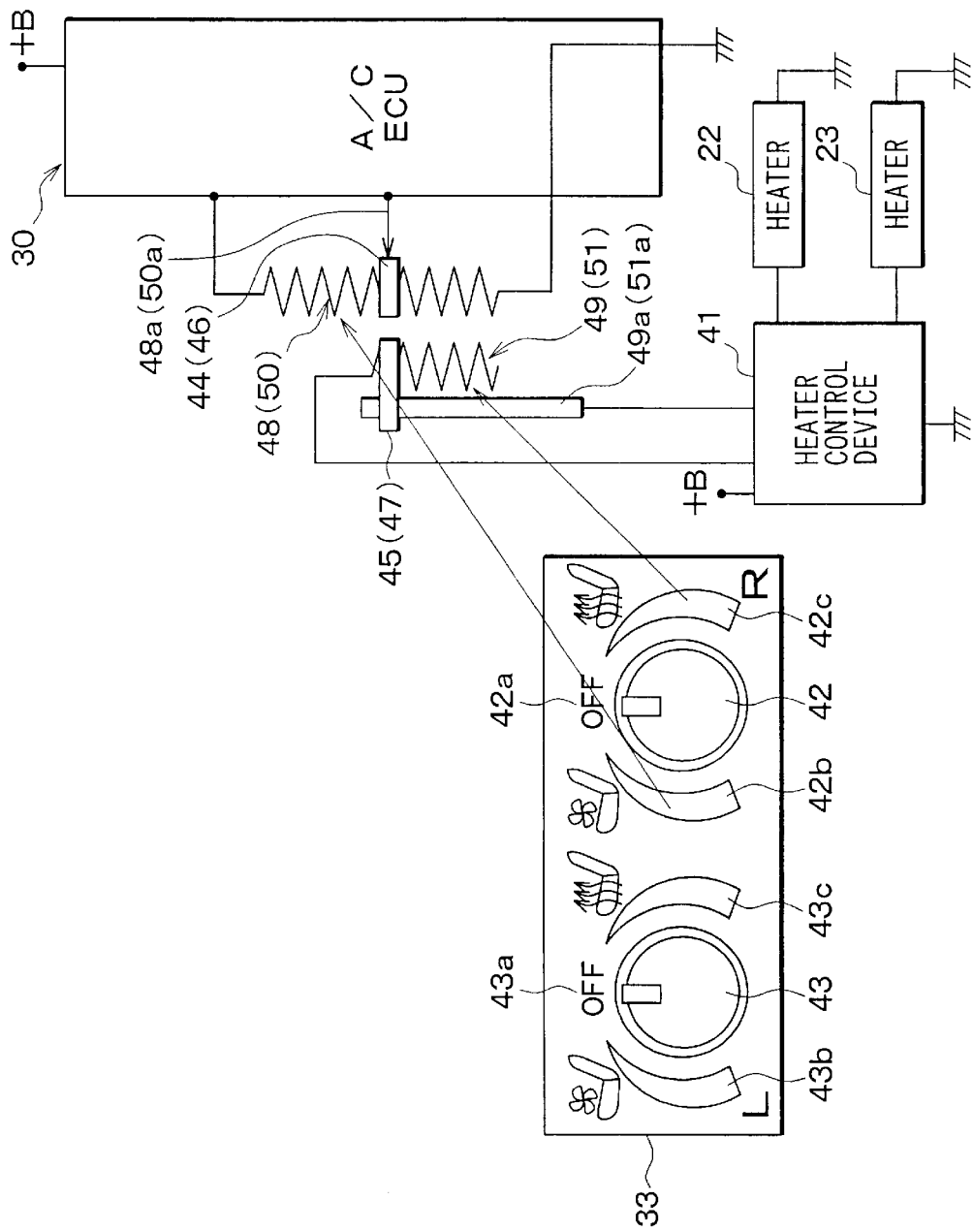
FIG. 3 is a schematic view showing an arrangement of a seat air conditioning panel according to the first embodiment.

Since the right and left manipulation dials 42, 43 are substantially identical with each other, FIGS. 2 and 3 only show the components corresponding to the right manipulation dial 42 for the sake of simplicity. Specifically, FIGS. 2 and 3 show a variable resistor mechanism, which is operated through the right manipulation dial 42, and the blower units 13, 14 of the seat air conditioning system, which are of the right seat.

On the backside of the seat air conditioning control panel 33, first and second movable conductor members 44, 45 are provided for the right manipulation dial 42, and first and second movable conductor members 46, 47 are provided for the left manipulation dial 43. In FIGS. 2 and 3, the parenthesized numerals indicate components of the variable resistor mechanism for the left manipulation dial 43.

Here, the first movable conductor member 44 and the second movable conductor member 45 of the right manipulation dial 42 are electrically insulated from each other and are mechanically, integrally connected to each other, and the first movable conductor member 46 and the second movable conductor member 47 of the left manipulation dial 43 are electrically insulated from each other and are mechanically integrally connected to each other. Thus, the first and second movable conductors 44, 45 rotate integrally with the right manipulation dial 42, and the first and second movable conductors 46, 47 rotate integrally with the left manipulation dial 43.

Two variable resistors, i.e., a first variable resistor 48 (50) for supplying an input to the air conditioning control device 30 and a second variable resistor 49 (51) for supplying an input to the heater control device 41 are provided to each manipulation dial 42 (43). A resistance value of each variable resistor 48, 49 (50, 51) varies according to an operational position of the manipulation dial 42 (43). The first and second variable resistors 48, 49 (50, 51) of each manipulation dial 42 (43) have an arcuate shape and are arranged adjacent to each other in two different imaginary planes, respectively, within a rotatable range (about 200 degrees in the case of FIG. 3) of the first and second movable conductor members 44, 45 (46, 47), or within a movable range of the manipulating dial 42 (43). The first movable conductor member 44 (46) is electrically connected to an intermediate terminal 48a (50a) of the first variable resistor 48 (50). Furthermore, the second movable conductor member 45 (47) is electrically connected to a terminal 49a (51a) of the second variable resistor 49 (51).

With reference to FIG. 3, when the manipulation dial 42 (43) is positioned to an OFF position 42a (43a), which is an intermediate point in the rotatable range (i.e., movable range) of the manipulation dial 42 (43), the intermediate terminal 48a (50a) of the first variable resistor 48 (50) has a predetermined intermediate electric potential. When the air conditioning control device 30 detects this intermediate electric potential, the air conditioning control device 30 outputs a stop (OFF) signal to the corresponding blower units 13, 14.

Furthermore, when the manipulation dial 42 (43) is placed in a left side air flow manipulation range 42b (43b) shown in FIG. 3, the air conditioning control device 30 outputs an air flow rate control signal, which changes the air flow rate of the blower units 13, 14 in a manner shown in FIG. 5 (described in greater detail below) based on a variation in the resistance value of the first variable resistor 48 (50), i.e., a variation in the electric potential of the intermediate terminal 48a (50a) in the air flow manipulation range 42b (43b).

On the other hand, the second variable resistor 49 (51) is electrically turned off when the manipulation dial 42 (43) is positioned in the left side air flow manipulation range 42b (43b) located on the left side in FIG. 3 or when the manipulation dial 42 (43) is position in the OFF position 42a (43a). In this way, when the manipulation dial 42 (43) is positioned in the left side air flow manipulation range 42b (43b) or in the OFF position 42a (43a), the heater control device 41 outputs the OFF signal to turn off the power supply to the corresponding electric heaters 22, 23.

When the manipulation dial 42 (43) is positioned in a right side heater manipulation range 42c (43c) shown in FIG. 3, the air conditioning control device 30 outputs an air flow rate control signal, which changes the air flow rate of the corresponding blower units 13, 14 in the manner shown in FIG. 5 (described in greater detail below) based on a variation in the resistance value of the first variable resistor 48 (50), i.e. a variation in the electric potential of the intermediate terminal 48a (50a) in the heater manipulation range 42c (43c). Furthermore, the heater control device 41 controls the voltage applied to the electric heaters 22, 23 to slightly increase the heater heating power of the electric heaters 22, 23 by a relatively small amount based on a variation in the resistance value of the second variable resistor 49 (51), i.e., a variation in the electric potential of the terminal 49a (51a) in the heater manipulation range 42c (43c), as shown in FIG. 5.

The air conditioning control device 30 has duty control capability for performing duty control of the voltage applied to the motor of the blower of the passenger room air conditioning unit 21 to control the air flow rate of the blower of the passenger room air conditioning unit 21. Thus, in the first embodiment, the duty control capability of the air conditioning control device 30 is used to perform duty control of the voltage applied to the fan drive motor 13a, 14a to control the air flow rate of the seat blower units 13, 14.

Figure 4:
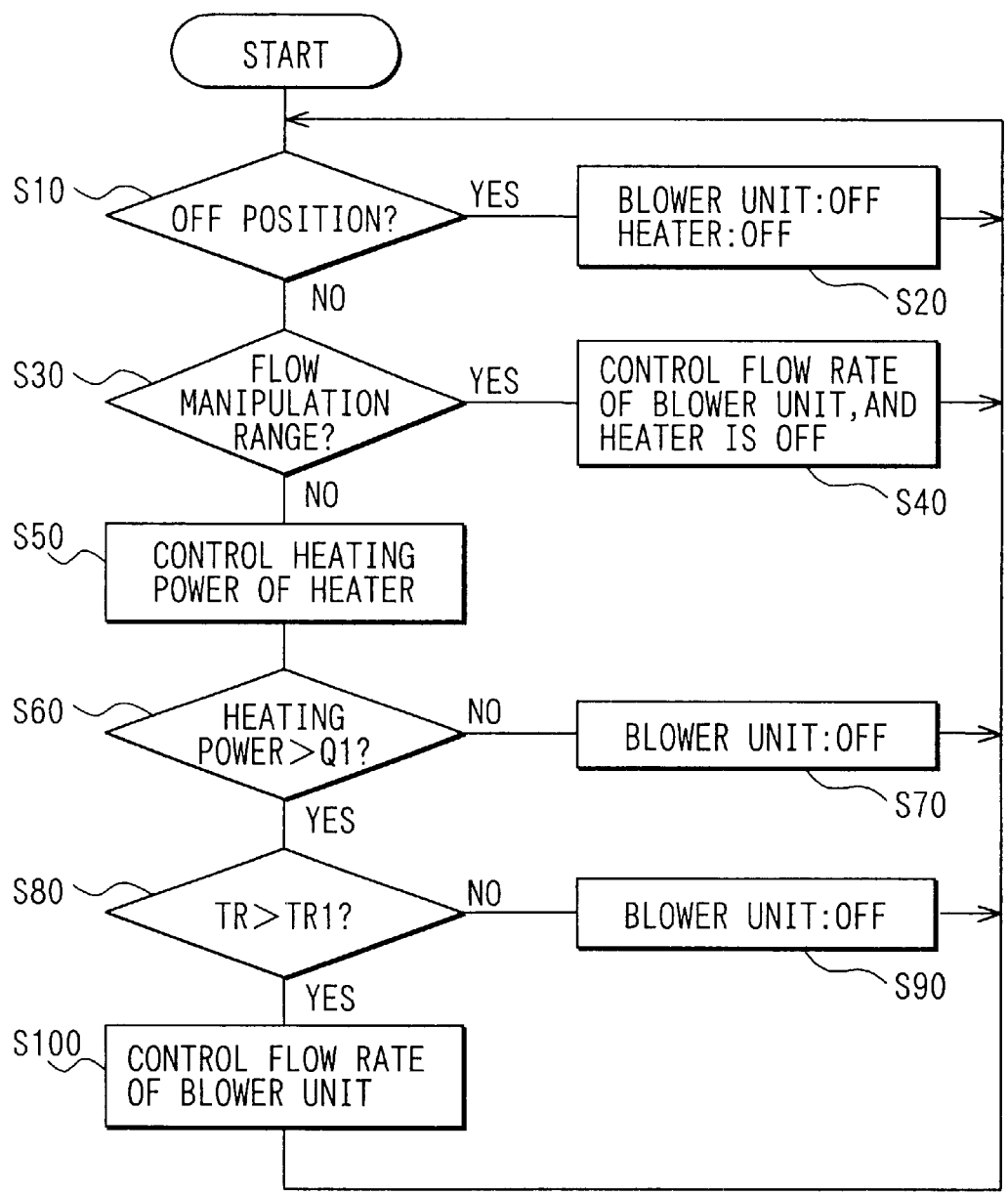
FIG. 4 is a flow chart showing operation according to the first embodiment.

Next, operation according to the first embodiment will be described with reference to FIGS. 4 and 5. FIG. 4 is a flow chart showing the air flow rate control of the blower unit 13, 14 performed by the air conditioning control device 30 and the heating power control of the electric heaters 22, 23 performed by the heater control device 41. FIG. 5 shows the air flow rate of the blower unit 13, 14 of the seat air conditioning system and the heater heating power (W) relative to the position of the manipulation dial 42, 43.

First, at step S10, it is determined whether the current operational position of the corresponding manipulation dial 42, 43 is in the OFF position 42a, 43a, which is the intermediate position. When it is determined that the current operational position of the manipulation dial 42, 43 is in the OFF position 42a, 43a, control proceeds to step S20. At step S20, both the blower units 13, 14 and the electric heaters 22, 23 are turned off.

When it is determined that the current operational position of the manipulation dial 42, 43 is not in the OFF position 42a, 43a at step S10, control proceeds to step S30. At step S30, it is determined whether the current operational position of the manipulation dial 42, 43 is in the air flow manipulation range 42b, 43b. When it is determined that the current operational position of the manipulation dial 42, 43 is in the air flow manipulation range 42b, 43b, control proceeds to step S40. At step S40, each blower unit 13, 14 is actuated such that the air flow rate of the blower unit 13, 14 is controlled and adjusted to the air flow rate that corresponds to the operational position of the manipulation dial 42, 43, and each electric heater 22, 23 is kept off.

Specifically, the air flow rate control is performed as follows. That is, when the manipulation dial 42, 43 shown in FIG. 3 is rotated to the left end position, the air flow rate of the blower unit 13, 14 is shifted to the maximum value (Hi), as shown in FIG. 5. Then, when the manipulation dial 42, 43 is rotated from the left end position in the right direction (clockwise direction), i.e., when the operational position of the manipulation dial 42, 43 is shifted toward the OFF position 42a, 43a, the air flow rate of the blower unit 13, 14 is reduced toward the minimum value (Lo). This flow rate control can be accomplished in the following manner. That is, the air conditioning control device 30 determines a variation in the electric potential of the intermediate terminal 48a, 50a and controls the voltage applied to the drive motor 13a, 14a of each blower unit 13, 14 based on the variation in the electric potential of the intermediate terminal 48a, 50a to control the rotational speed of the drive motor 13a, 14a.

When it is determined that the current operational position of the manipulation dial 42, 43 is not in the air flow manipulation range 42b, 43b at step S30, the operational position of the manipulation dial 42, 43 should be in the heater manipulation range 42c, 43c. In this case, control proceeds to step S50 where the heating power of the electric heater 22, 23 is controlled and adjusted to the heating power that corresponds to the operational position of the manipulation dial 42, 43.

Specifically, this heating power control is performed as follows. That is, when the manipulation dial 42, 43 is rotated to the right end position, the heating power of the electric heater 22, 23 is shifted to the maximum value (Hi), as shown in FIG. 5. Then, when the manipulation dial 42, 43 is rotated from the right end position in the left direction (counterclockwise direction), i.e., when the operational position of the manipulation dial 42, 43 is shifted toward the OFF position 42a, 43a, the heating power of the electric heater 22, 23 is reduced toward zero (OFF). This heating power control can be accomplished in the following manner. That is, the heater control device 41 determines a variation in the electric potential of the terminal 49a, 51a and controls the voltage (power consumption) applied to each electric heater 22, 23 based on the variation in the electric potential of the terminal 49a, 51a.

Figure 5:
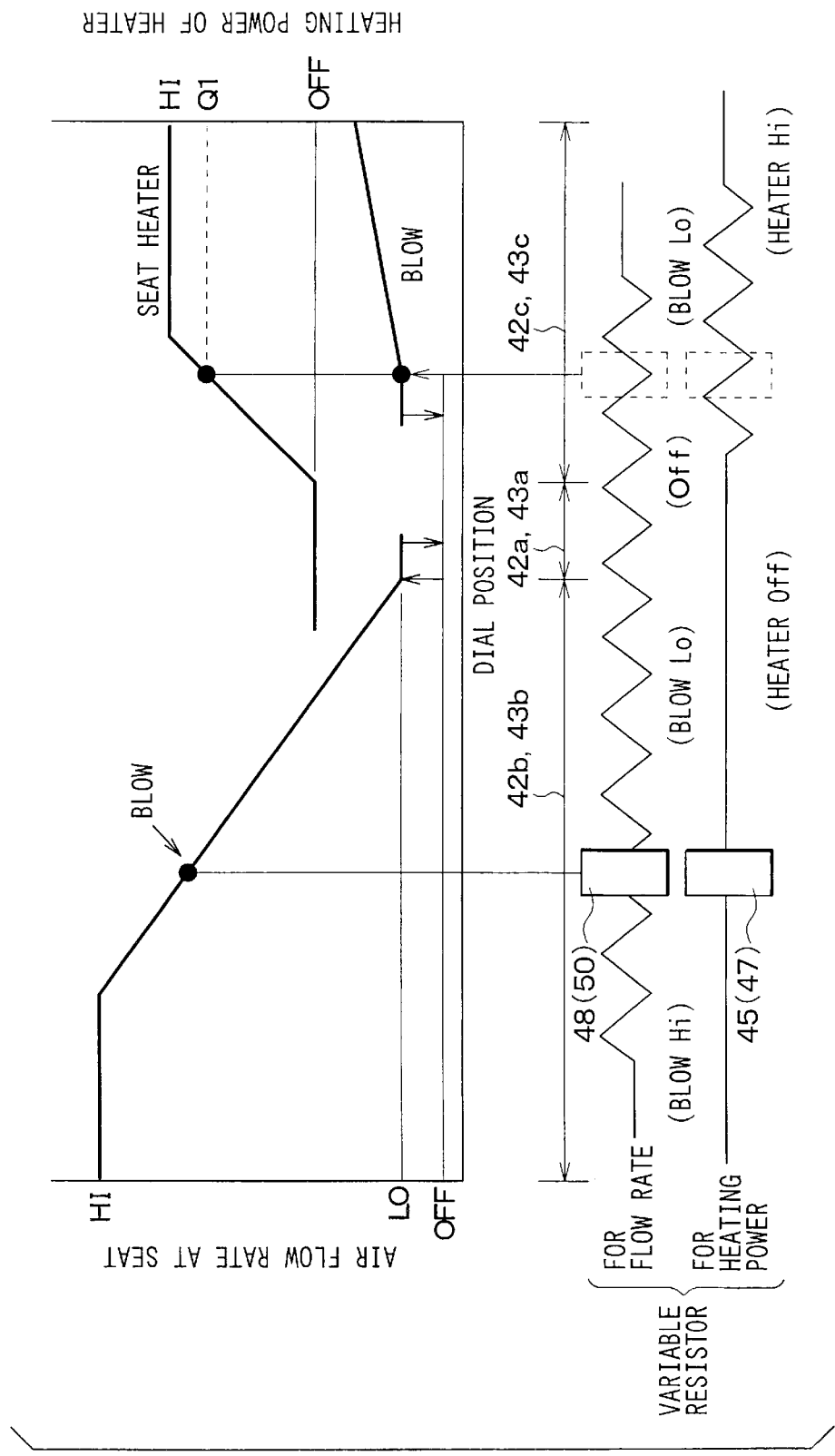
FIG. 5 is a diagram showing operational characteristics according to the first embodiment.

Next, at step S60, it is determined whether the heating power of the electric heater 22, 23, which is determined by the operational position of the manipulation dial 42, 43, is greater than a predetermined value Q1 (FIG. 5). When it is determined that the heating power of the electric heater 22, 23 is equal to or less than the predetermined value Q1, control proceeds to step S70. At step S70, the blower unit 13, 14 is turned off.

On the other hand, when it is determined that the heating power of the electric heater 22, 23 is greater than the predetermined value Q1, control proceeds to step S80. At step S80, it is determined whether the inside air temperature TR is greater than a predetermined temperature TR1 (e.g., 23 degrees Celsius). When it is determined that the inside air temperature TR is equal to or less than the predetermined temperature TR1, control proceeds to step S90 where the blower unit 13, 14 is turned off.

When the inside air temperature TR is greater than the predetermined temperature TR1 (e.g., 23 degrees Celsius), control proceeds to step S100 where the air flow rate of the blower unit 13, 14 is controlled to correspond with the operational position of the manipulation dial 42, 43. Specifically, this air flow rate control is performed as follows. That is, when the manipulation dial 42, 43 is rotated to a position where the heater heating power coincides with the predetermined value Q1, the air flow rate of the blower unit 13, 14 becomes minimum value (Lo), as shown in FIG. 5. Then, when the manipulation dial 42, 43 is rotated from this operational position of the manipulation dial 42, 43 in the right direction (increasing direction for increasing the heater heating power), the air flow rate of the blower unit 13, 14 is slightly increased by a relatively small amount from the minimum value (Lo).

This relatively small increased amount (or simply called as a relatively small increase) of the air flow rate of the blower unit 13, 14, which is synchronized with the increase of the heater heating power, is preferably limited to at most about 40% of the minimum value (Lo) to restrain cold air blow, which could be induced by an excessively high air flow rate.

Next, advantages of the first embodiment will be described. In the vehicle seat air conditioning system, which includes both the electric heaters 22, 23 and the blower units 13, 14, the heater heating power and the air flow rate can be set by rotating the single manipulation dial 42, 43. Thus, the operation of the operator is simplified, improving the operability of the system. Furthermore, since there is only one manipulating member to set the heater heating power and the air flow rate, the manipulating member can be produced at the reduced cost, and the accommodating space for accommodating the manipulating member can be reduced.

Furthermore, in the vehicle, as described above, the heating power of the electric heater 22, 23 accommodated in the seat is normally set to a relatively small value, i.e., about 60 to 90 W due to the limitation imposed by the balance between the amount of charged electricity and the amount of discharged electricity at the vehicle battery 34. Thus, when the air is blown by the blower unit 13, 14 at the excessively high air flow rate relative to the heating power of the electric heater 22, 23, the temperature of the blown air cannot rise to a sufficient level. Thus, the cold blown air is discharged around the occupant seated on the seat 10, deteriorating feeling of warmness of the occupant.

However, according to the first embodiment, as shown in FIG. 5, when the heating power of the electric heater 22, 23 is equal to or less than the predetermined value Q1, the blower unit 13, 14 is stopped at step S70 to stop the blowing of the air from the seat 10. Thus, deterioration of feeling of the warmness caused by the cold air can be prevented.

Furthermore, when the temperature in the passenger room, i.e., the inside air temperature TR is relatively low, the cold inside air, which is located inside the passenger room, is drawn and blown by the blower units 13, 14, so that the temperature of the blown air from the seat 10 does not easily increase, and thus the cold air is likely blown toward the passenger. Also, when the inside air temperature is relatively low, the passenger becomes sensitive to the annoyance induced by blowing of the cold air. Thus, in the first embodiment, when the inside air temperature TR is equal to or less than the predetermined temperature TR1 (e.g., 23 degrees Celsius), the blower units 13, 14 are stopped at step S90 to stop blowing of the air from the seat 10 irrespective of the heater heating power determined by the operational position of the manipulation dial 42, 43. In this way, the deterioration of the feeling of warmness, which could be induced by blowing of the cold air, can be effectively prevented when the inside temperature in the passenger room is relatively low.

When the heating power of the electric heater 22, 23 is greater than the predetermined value Q1, the air flow rate of the blower unit 13, 14 is increased in correspondence with the heating power of the electric heater 22, 23, so that the appropriate flow rate of warm air, which is suitable to the current heating power of the electric heater 22, 23, can be achieved.

(Second Embodiment)

Figure 6:
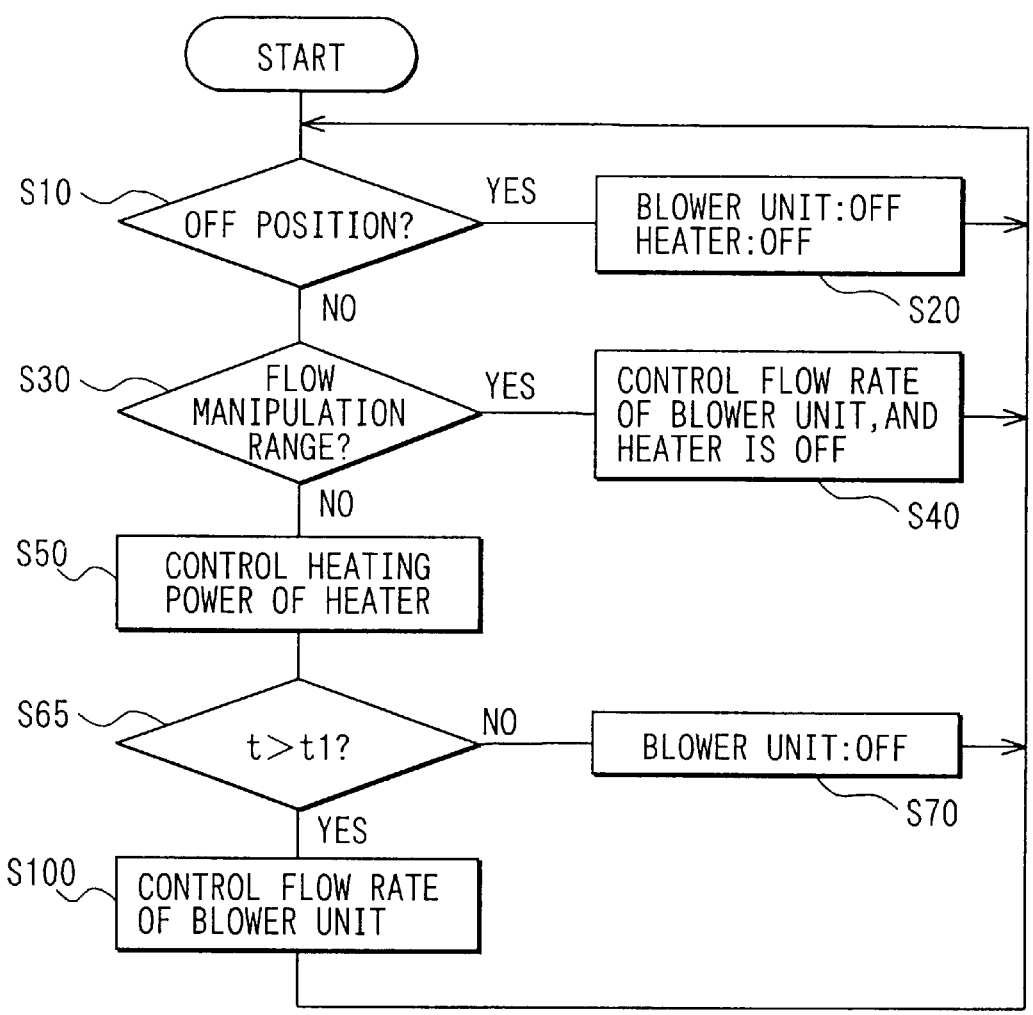
FIG. 6 is a flow chart showing operation according to a second embodiment of the present invention.

In the first embodiment, the heating power of the electric heater 22, 23 is judged at step S60, and the inside air temperature TR is judged at step S80. When the heater heating power is equal to or less than the predetermined value Q1, the blower units 13, 14 are stopped. Also, when the inside air temperature TR is equal to or less than the predetermined temperature TR1, the blower units 13, 14 are stopped. In a second embodiment, as shown in FIG. 6, steps S60, S80 of the first embodiment are eliminated, and there is provided step S65 for judging an elapsed time period of the electric heater 22, 23 after initiation of energization of the electric hater 22, 23 is provided.

When it is determined that the elapsed time period t after initiation of energization of the electric heaters 22, 23 is equal to or less than a predetermined time period t1 (e.g., 10 minutes) at step S65, control proceeds to step S70. At step S70, the blower units 13, 14 are stopped. On the other hand, when it is determined that the elapsed time period t after the initiation of energization of the electric heaters 22, 23 is greater than the predetermined time period t1 at step S65, control proceeds to step S100. At step S100, the blower units 13, 14 are activated and controlled to provide the air flow rate that coincides with the operational position of the manipulation dial 42, 43.

In the second embodiment, when the predetermined time period t1 (e.g., 10 minutes) has elapsed after the initiation of energization of the electric heaters 22, 23, the heating temperature of each electric heater 22, 23 should be raised to and stabilized at a predetermined temperature, which coincides with the heating power of the electric heater 22, 23. Thus, when the blower units 13, 14 are activated upon the stabilization of the heating temperature of the electric heater 22, 23, blowing of the cold air right after the initiation of energization of the electric heaters 22, 23 during air temperature rising period can be advantageously prevented. Thus, deterioration of feeling of warmness of the occupant can be prevented.

(Third Embodiment)

Figure 7:
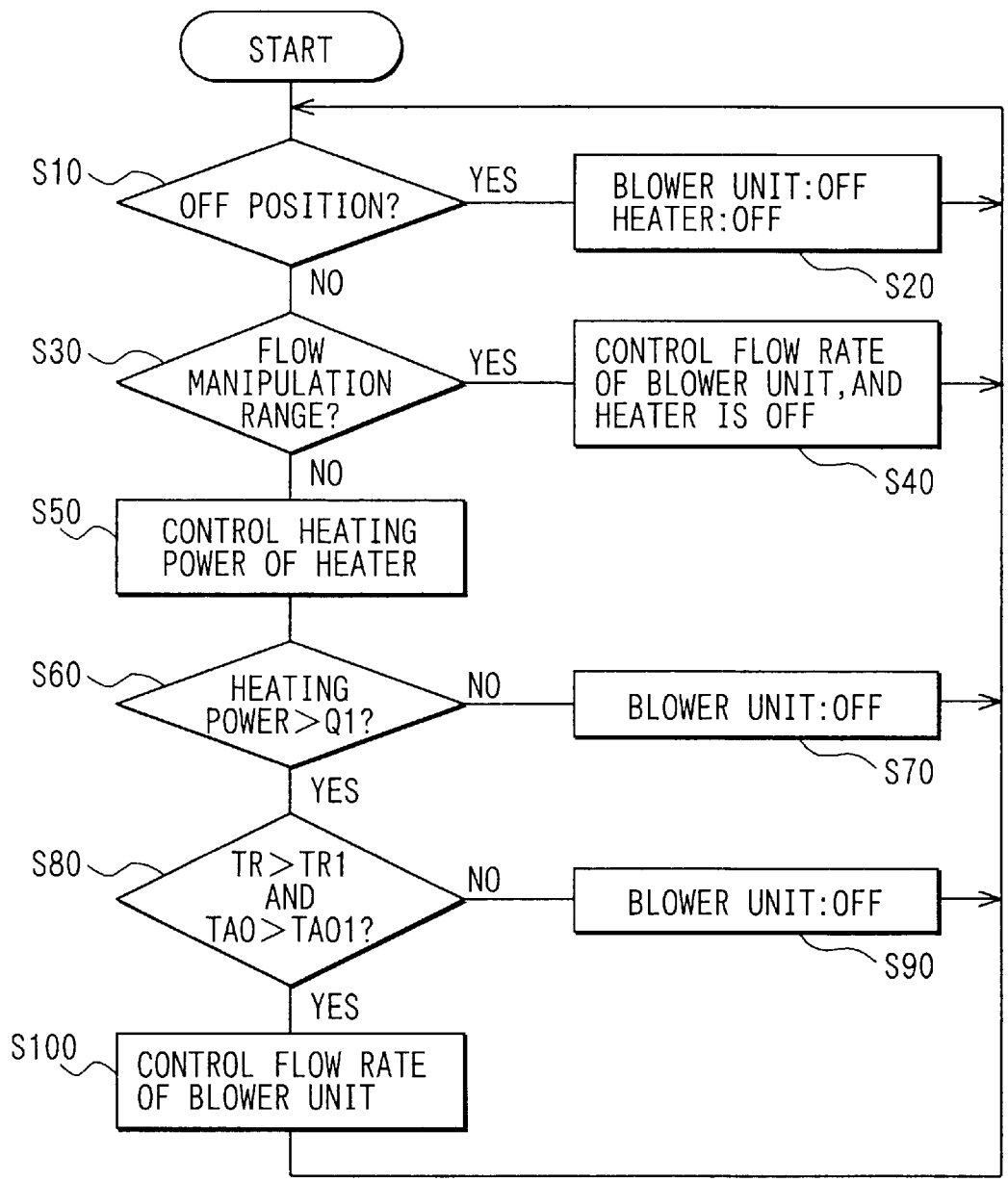
FIG. 7 is a flow chart showing operation o a third embodiment of the present invention.

In the first embodiment, only the inside air temperature TR is judged at step S80. When it is determined that the inside air temperature TR is equal to or less than the predetermined temperature TR1 at step S80, the blower units 13, 14 are stopped. Contrary to this, in a third embodiment of the present invention, at step S80 in FIG. 7, it is determined whether the following two conditions are both satisfied. The first condition is that the inside air temperature TR is greater than the predetermined temperature TR1. The second condition is that a target outlet air temperature TAO is greater than a predetermined temperature TAO1.

As is known in the art, the target outlet air temperature TAO is the target temperature of the air discharged from the passenger room air conditioning unit 21 into the passenger room and is necessary to maintain the passenger room air temperature (inside air temperature) TR at a selected passenger room air temperature Tset irrespective of a variation in the air conditioning heat load of the vehicle. The selected passenger room air temperature Tset is selected and is set through the target air temperature setting switch 32a of the air conditioning control panel 32.

As is known in the art, the target outlet air temperature TAO is computed by the air conditioning control device 30 based on the selected passenger room air temperature Tset, the inside air temperature TR, the outside air temperature TAM and the amount of solar radiation TS. The target outlet air temperature TAO is used as the basic target value for the automatic air conditioning control.

In the heating operation where the electric heaters 22, 23 are energized, the target outlet air temperature TAO is increased in synchronism with increase of the heating heat load to maintain the room temperature at the selected passenger room air temperature Tset.

In the heating operation where the electric heaters 22, 23 are energized, when one of the inside air temperature TR and the target outlet air temperature TAO is equal to or less than the corresponding predetermined value TR1, TAO1, NO is returned at step S80, and control proceeds to step S90. At step S90, the blower units 13, 14 are stopped. On the other hand, when both the inside air temperature TR and the target outlet air temperature TAO are greater than the corresponding predetermined value TR1, TAO1, YES is returned at step S80. Thus, control proceeds to step S100 where the air flow rate is controlled to correspond with the operational position of the manipulation dial 42, 43.

In the first embodiment, when the inside air temperature TR is greater than the predetermined temperature TR1, control proceeds to step S100 where the blower units 13, 14 are activated. When the target outlet air temperature TAO is equal to or less than the predetermined temperature TAO1 (e.g., 40 degrees Celsius), and thus the heating heat load of the entire vehicle is substantially small, the blow mode of the passenger room air conditioning unit 21 is normally automatically shifted from the foot mode to the bi-level mode in synchronism with decrease of the target outlet air temperature TAO.

When the bi-level mode is set, the foot side (lower side) outlet air temperature becomes higher than the face side (upper side) outlet air temperature in the passenger room air conditioning unit 21 to provide a corresponding temperature distribution where a relatively low temperature zone is formed around a head of the occupant and a relatively high temperature zone is formed around feet of the occupant. Thus, when the warm air is blown from the seat 10 during the bi-level mode, this temperature distribution is likely disturbed, resulting in deterioration of feeling of warmness during the bi-level mode operation of the passenger room air conditioning unit 21.

Accordingly, in the third embodiment, the blower units 13, 14 are activated only when both the inside air temperature TR and the target outlet air temperature TAO are greater than the corresponding predetermined value TR1, TAO1. Therefore, in the predetermined TAO temperature condition (e.g., equal to or less than 40 degrees Celsius) where the bi-level mode is selected and is set in the passenger room air conditioning unit 21, the blower units 13, 14 can be stopped to stop blowing of the warm air from the seat 10. In this way, deterioration of feeling of warmness during the bi-level mode operation of the passenger room air conditioning unit 21 can be prevented.

(Other Embodiments)

In each of the first to third embodiments, the air flow rate of each blower unit 13, 14 is controlled to coincide with the operational position of the corresponding manipulation dial 42, 43 at step S100. Alternatively, the air flow rate of each blower unit 13, 14 can be controlled to coincide with the heating heat load at step S100.

Specifically, the heating heat load can be determined based on the target outlet air temperature TAO, which is computed by the air conditioning control device 30 and servers as an informational value indicating the corresponding heating heat load of the entire vehicle. During the heating operation where the electric heaters 22, 23 are energized, the target outlet air temperature TAO is increased as the heating heat load is increased.

Thus, at step S100, the air flow rate of each blower unit 13, 14 can be controlled as follows. That is, when the target outlet air temperature TAO is increased to cause an increase in the heating heat load, the air flow rate of each blower unit 13, 14 is accordingly increased. In this way, when the heating heat load is increased, the air flow rate of the warm air from the seat 10 can be automatically increased to improve feeling of warmness of the occupant.

Even in this instance, the increase of the air flow rate of the blower unit 13, 14, which is in synchronism with the increase of the heating heat load, is preferably limited to at most about 40% of the minimum value (Lo) to restrain cold air blow induced by the excessively high flow rate.

In each of the first to third embodiments, the resistance value of the first variable resistor 48, 50, which is used as the input (for controlling the air flow rate) to the air conditioning control device 30, and the resistance value of the second variable resistor 49, 51, which is used as the input (for controlling the heating power) to the heater control device 41, are changed synchronously with rotation of the manipulation dial 42, 43, which is manipulated by the occupant. Alternatively, a lever-like member, which can be linearly reciprocated upon manipulation thereof, can be used as a manipulating means for manipulating the first and second variable resistors 48–51.

Furthermore, in each of the first to third embodiments, the first variable resistor 48, 50 is used as an air flow rate command signal generating means for outputting the variable flow rate command signal, which commands the air flow rate of the seat blower unit 13, 14, and the second variable resistor 49, 51 is used as a heating power command signal generating means for outputting the variable heating power command signal, which commands the heating power of the seat electric heater 22, 23. In place of the variable resistors, two types of switches, which are opened and closed synchronously with manipulation of a single manipulating means, can be provided. In such a case, the air flow rate command signal and the heating power command signal can be generated based on open and close signals of the two switches.

Furthermore, the air conditioning control device 30 and the heater control device 41 can be integrated as a single control device.

Additional advantages and modifications will readily occur to those skilled in the art. The invention in its broader terms is therefore not limited to the specific details, representative apparatus, and illustrative examples shown and described.

What is claimed is:

1. A seat air conditioning system for a vehicle occupant seat that is placed in a passenger room of a vehicle and includes at least one exterior cover member, which forms an occupant contacting surface of the seat for contacting with a vehicle occupant and has a plurality of outlet openings penetrating through the exterior cover member, the seat air conditioning system comprising:

at least one electric heater disposed inside the seat, wherein each electric heater heats a corresponding one of the at least one exterior cover member of the seat;

at least one blower unit disposed inside the seat, wherein each blower unit blows air through the outlet openings of a corresponding one of the at least one exterior cover member;

a single manipulating means for manipulating the at least one electric heater and the at least one blower unit;

an air flow rate command signal generating means for outputting the air flow rate command signal; and a heating power command signal generating means for outputting the heating power command signal, wherein:

the single manipulating means is disposed inside the passenger room and is manually manipulatable;

a variable heating power command signal, which commands increasing or decreasing of a heating power of each corresponding electric heater, and a variable flow rate command signal, which commands increasing or decreasing of an air flow rate of each corresponding blower unit, are generated through adjustment manipulation of the single manipulating means in synchronism with movement of the single manipulating means;

the air flow rate command signal generating means and the heating power command signal generating means are arranged adjacent to each other within a movable range of the manipulating means and are placed in two different imaginary planes, respectively; and the air flow rate command signal of the air flow rate command signal generating means and the heating power command signal of the heating power command signal generating means are varied in synchronism with positional change of the manipulating means within the movable range of the manipulating means.

2. A seat air conditioning system according to claim 1, wherein the manipulating means is a dial, which is manually rotatable.

3. A seat air conditioning system according to claim 1, wherein the movable range of the manipulating means includes:
- an OFF position, in which the electric heater and blower unit are both turned off;
- an air flow manipulation range that is located on one side of the OFF position in the movable range of the manipulating means, wherein when the manipulating means is moved within the air flow manipulation range from the OFF position toward a first end of the movable range of the manipulating means, an air flow rate of the blower unit is increased; and
- a heater manipulation range that is located on the other side of the OFF position in the movable range of the manipulating means, wherein when the manipulating means is moved within the heater manipulation range from the OFF position toward a second end of the movable range of the manipulating means opposite to the first end, a heating power of the electric heater is increased, and at the same time an air flow rate of the blower unit is slightly increased by a relatively small amount.

4. A seat air conditioning system according to claim 1, wherein:
- the air flow rate command signal generating means is a variable resistor that has a variable resistance value, which varies according to an operational position of the manipulating means in the movable range of the manipulating means; and
- the heating power command signal generating means is a variable resistor that has a variable resistance value, which varies according to an operational position of the manipulating means in the movable range of the manipulating means.

5. A seat air conditioning system according to claim 1, further comprising a control means for controlling the electric heater and the blower unit, wherein:
- when the air temperature in the passenger room is equal to or less than a predetermined temperature upon energization of the electric heater, the control means turns off the blower unit; and
- when the air temperature in the passenger room is greater than the predetermined temperature upon energization of the electric heater, the control means turns on the blower unit.

6. A seat air conditioning system according to claim 1, further comprising a control means for controlling the electric heater and the blower unit, wherein:
- the control means keeps the blower unit turned off until a predetermined time period elapses since energization of the electric heater; and
- the control means turns on the blower unit upon the elapse of the predetermined time period.

7. A seat air conditioning system according to claim 5, further comprising an operational mode for controlling an air flow rate of the blower unit upon activation of the blower unit based on an informational value, which indicates a corresponding heating heat load of the entire vehicle.

8. A seat air conditioning system according to claim 1, further comprising a control means for controlling the electric heater and the blower unit, wherein:
- the control means turns off the blower unit upon energization of the electric heater when at least one of the following two conditions are satisfied:
  - the air temperature in the passenger room is equal to or less than a predetermined temperature; and
  - an informational value, which indicates a corresponding heating heat load of the entire vehicle, is equal to or less than a predetermined value; and
- the control means turns on the blower unit upon energization of the electric heater when the following two conditions are both satisfied:
  - the air temperature in the passenger room is greater than the predetermined temperature; and
  - the informational value, which indicates the corresponding heating heat load of the entire vehicle, is greater than the predetermined value.

9. A seat air conditioning system according to claim 8, further comprising an operational mode for controlling an air flow rate of the blower unit upon activation of the blower unit based on the informational value, which indicates the corresponding heating heat load of the entire vehicle.

10. A seat air conditioning system according to claim 5, wherein the control means is a control device that automatically controls a passenger room air conditioning unit, which performs air conditioning of the passenger room.

11. A seat air conditioning system according to claim 7, wherein the informational value, which indicates the corresponding heating heat load of the entire vehicle, is a target outlet air temperature of a passenger room air conditioning unit, which performs air conditioning of the passenger room.

12. A seat air conditioning system according to claim 1, wherein:
- the at least one exterior cover member includes two exterior cover members;
- the seat includes:
  - a seat cushion assembly that includes one of the two exterior cover members and supports buttocks of the vehicle occupant; and
  - a backrest assembly that includes the other one of the exterior cover members and supports a back region of the vehicle occupant;
- the at least one electric heater includes two electric heaters, which are arranged in the seat cushion assembly and the backrest assembly, respectively; and
- the at least one blower unit includes two blower units, which are arranged in the seat cushion assembly and the backrest assembly respectively.

* * * * *